Patented June 29, 1937

2,085,065

UNITED STATES PATENT OFFICE 2,085,065

AROMATIC MERCURY SUBSTITUTED HETEROCYCLIC COMPOUND

Carl N. Andersen, Watertown, Mass., assignor to Lever Brothers Company, a corporation of Maine No Drawing. Application February 25, 1935
Serial No. 8,081

16 Claims. (Cl. 260—13)

The present invention relates to the production of certain new organic mercury compounds, and more particularly to aromatic mercury derivatives of substituted heterocyclic compounds.

It is the object of my invention to produce new organic mercury compounds useful as germicides and for other therapeutic purposes.

More particularly, it is an object of my invention to prepare certain new organic mercury compounds which may be regarded as derivatives of heterocyclic compounds.

I have discovered that when certain aromatic mercury compounds are reacted with certain heterocyclic compounds, compounds are produced which have extraordinarily high potency as antiseptics and germicides and at the same time are characterized by relatively low toxicity and other desirable properties.

The above mentioned aromatic mercury compounds contain the essential radical, which will be represented as RHg—. R represents an aromatic structure, to a carbon atom of which the mercury is directly attached, and may be one aromatic nucleus with or without side chains. The expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl and naphthyl groups.

The heterocyclic compound may be a compound with any number of atoms in the ring. Five and six atom rings are the most common. The hetero-atom in the ring is usually N, S, Se, or O. There may be more than one hetero-atom in the ring. More particularly the heterocyclic compounds involved are those in which the hetero-atom or atoms are not linked to a hydrogen atom and in which one or more of the hydrogen atoms attached to the carbon in the ring are substituted by any monovalent radical except the carboxyl. I shall refer to such compounds as substituted heterocyclic compounds.

The heterocyclic compounds in which a hydrogen atom is attached to the hetero-atom are disclosed and claimed in my application, Serial No. 754,374, filed Nov. 22, 1934. Heterocyclic compounds in which one or more carboxyl groups are attached to the ring elements are disclosed and claimed in my application, Serial No. 967, filed Jan. 5, 1935.

The following are examples of heterocyclic compounds which fall within the above identified class; thiophene; 2,4-diphenyl thiophene; 8-hydroxy quinoline; acridine; 2,6-dimethyl pyridine; 2,4-dimethyl pyridine; collidine; quinaldine; and Rheonine A (Schultz 7th ed. #911, "Colour Index" #795); Fastusol yellow (Schultz #935, "Colour Index" #814); and the compounds in Primuline (Schultz #932, Colour Index #812).

I have prepared aromatic mercury compounds corresponding to all of the above noted heterocyclic compounds. The preparation of these compounds together with other compounds I have investigated comprise a sufficiently representative number to lead me to believe that all of this type of heterocyclic compounds can be employed to produce my novel mercury compounds. The compounds so prepared have, in greater or lesser, but always in relatively high degree, desirable antiseptic and germicidal properties. I therefore regard my invention as generic to and including this entire group of substituted heterocyclic compounds.

The general method of preparing these compounds consists in reacting together the substituted heterocyclic compound and a compound containing the aromatic mercury radical of the above mentioned type. A common solvent for both reacting components is employed. The compound resulting from the reaction is usually relatively insoluble as compared with the reacting components, and upon its precipitation may be filtered, washed and dried. If the compound formed is relatively soluble, the solution may be concentrated and the compound will crystallize out. The aromatic mercury compound I prefer to employ in effecting the reaction is the hydroxide. I may also employ a soluble salt containing the aromatic mercury radical, for example, the acetate or the lactate.

The aromatic mercury radical combines in some manner with the substituted heterocyclic compound. From my present investigation I am unable to state the mechanism of the reaction or the structural formulae to be assigned to the compounds produced. However, having herein disclosed my invention and the compounds, so that they may be produced by one skilled in the art, I prefer not to speculate in assigning any definite formulae to the compounds produced or stating in what position or how the aromatic mercury radical is attached to the heterocyclic compound. While I do not wish to exclude this possibility, I doubt if the hydrogen atom or atoms or the substituted radicals attached to the carbon atoms in the ring are replaced by aromatic mercury radicals. It is therefore more likely that the aromatic mercury radical is attached in some manner to the hetero-atom. I may mention also, by way of suggestion only, that the nitrogen atom may change its valence and add on one or more aromatic mercury radicals. It is also possible that the entire aromatic mercury compound is added on to form an addition product. It is also possible that if there are double bonds in the ring, the structure may be rearranged to release the third valence of the nitrogen, by which the aromatic mercury radical may be attached.

The following examples are given as illustrative of the method by which all the compounds of this group may be prepared, and as illustrative of representative aromatic mercury compounds falling within the scope of my invention.

Example 1

11.96 grams of phenylmercury hydroxide is dissolved in 3 liters of alcohol and heated until solution is complete. The solution is filtered to remove any insoluble material. To the filtrate is added 4.72 grams of 2,4-diphenyl thiophene in solid form. The mixture is concentrated to a small volume and after filtration is allowed to stand, during which time a precipitate is formed. The precipitate is filtered washed and dried. It melts at 112° C. Upon recrystallization from alcohol glistening white crystals are formed which melt at 114–114.5° C. The compound is the phenylmercury derivative of 2,4-diphenyl thiophene.

Example 2

17.64 grams of phenylmercury hydroxide is dissolved in 2 liters of water and heated until solution is complete. The solution is filtered to remove any insoluble material. To the filtrate is added 10.74 grams of acridine dissolved in 500 cc. of a 50% alcoholic solution. A yellow solution results with an oil spreading on the surface. The mixture is allowed to stand and cool and light yellow needles result. The mixture is filtered, after which the precipitate is washed well with warm water and dried. It has a melting point of 107–108° C. and is the phenylmercury derivative of acridine.

Example 3

17.64 grams of phenylmercury hydroxide is dissolved in 2 liters of water and heated until solution is complete. The solution is filtered to remove any insoluble material. To the filtrate is added 6.42 grams of 2,6-dimethyl pyridine dissolved in 50 cc. of alcohol. No precipitate results but when the solution is concentrated to one-half its volume, crystals separate which are removed by filtration, washed well with warm water and a few cc. of alcohol and dried. It has a melting point of 212° C. and is the phenylmercury derivative of 2,6-dimethyl pyridine.

Example 4

17.64 grams of phenylmercury hydroxide is dissolved in 2 liters of water and heated until solution is complete. The solution is filtered to remove any insoluble material. To the filtrate is added 8.58 grams of quinaldine dissolved in 50 cc. of alcohol. A greenish tinge develops in the solution and after standing for 18 hours, the precipitate which has separated is removed by filtration, washed and dried. It melts at 218° C. and is the phenylmercury derivative of quinaldine.

All of the other heterocyclic compounds of this type may be similarly treated to form corresponding aromatic mercury derivatives. From the specific examples given it will be obvious to one skilled in the art what procedure is to be followed in producing these other compounds. Theoretical quantities are employed. In some cases, if desired, approximately 10% excess of the substituted heterocyclic compound may be used in order to insure complete conversion of the aromatic mercury compound.

The operativeness of the process is not found to depend in any degree upon the temperature at which the reaction is effected. It is convenient to use heat because it facilitates the solution of the reacting components and speeds the reaction, but the process can be carried out at any temperature, for example, room temperature. Similarly, the process may be carried out in any mutual solvent. Water is usually employed for reasons of convenience when the reacting components are water soluble, but if not, other solvents, such as the alcohols, acetone, or mixtures of these with each other or water, may be used.

All of the compounds produced as above described are characterized by extraordinarily high potency as germicides. Tests to determine the efficacy of some of them in killing B. typhosus and Staph. aureus were carried on under the following conditions:

Aqueous solutions of varying dilutions from 1–10,000 upward until killing ceased, were made up.

These dilutions were employed in the conduct of the tests by the following methods:

Circular 198, U. S. Dept. of Agriculture, Dec. 1931, described as F. D. A. method against *Eberthella typhi* (typhoid bacillus) at 37° C. and F. D. A. special method against *Staph. aureus* at 37° C.

As illustrative of the potency of the compounds the killing power of the following compounds is given merely as illustrative:

The figures represent the maximum dilutions at which killing in 15 minutes resulted:

| | B. typhosus | Staph. aureus |
|---|---|---|
| Phenylmercury derivative of 2,6-dimethyl pyridine | 1:80,000 | 1:30,000 |
| Phenylmercury derivative of 8-hydroxy quinoline | 1:70,000 | 1:25,000 |
| Phenylmercury derivative of 2,4-diphenyl thiophene | 1:60,000 | 1:35,000 |

In addition to their high germicidal value, all of these compounds are characterized by relatively low toxicity. Because of these properties it is possible to use them in extreme dilutions and in many situations where known germicides, because of toxic or other undesired properties, cannot be employed. They may be used externally and locally, and in some cases administered internally with satisfactory results from the germicidal standpoint and without harmful effect to the body or its functions.

The compounds retain their germicidal activity when incorporated in soap and various menstruums employed in preparing germicidal compositions.

When these new compounds are to be used directly as germicides they may be employed in aqueous or other solutions or they may be incorporated into various preparations such as mouth washes, tooth pastes, soaps, ointments, etc.

I claim:

1. An aromatic mercury substituted heterocyclic compound, in which the radical RHg is attached to a substituted heterocyclic compound, where R represents an aromatic structure to a carbon atom of which the mercury is directly attached and in which none of the carbon atoms has direct linkage with any element other than hydrogen, carbon or mercury, and where the substituted heterocyclic compound to which the RHg radical is attached contains but one hetero atom which has direct linkage with only atoms in the heterocyclic ring.

2. An aromatic mercury substituted heterocyclic compound, in which the radical RHg is attached to a substituted heterocyclic compound, where R represents an aromatic structure to a carbon atom of which the mercury is directly attached and in which none of the carbon atoms has direct linkage with any element other than hydrogen, carbon or mercury, and where the substituted heterocyclic compound to which the RHg radical is attached contains but one nitrogen atom which has direct linkage with only atoms in the heterocyclic ring.

3. An aromatic mercury substituted heterocyclic compound, in which the radical RHg is attached to a substituted heterocyclic compound, where R represents an aromatic structure to a carbon atom of which the mercury is directly attached and in which none of the carbon atoms has direct linkage with any element other than hydrogen, carbon or mercury, and where the substituted heterocyclic compound to which the RHg radical is attached contains but one sulphur atom which has direct linkage with only atoms in the heterocyclic ring.

4. An aromatic mercury substituted heterocyclic compound in which the radical RHg is attached to a substituted heterocyclic compound, where R represents an aromatic structure to a carbon atom of which the mercury is directly attached and in which none of the carbon atoms has direct linkage with any element other than hydrogen, carbon or mercury, and where the substituted heterocyclic compound to which the RHg radical is attached is a condensed benzene ring and a heterocyclic ring having but one hetero atom which has direct linkage with only atoms in the ring.

5. An aromatic mercury substituted heterocyclic compound, in which the radical RHg is attached to a substituted heterocyclic compound, where R represents an aromatic structure to a carbon atom of which the mercury is directly attached and in which none of the carbon atoms has direct linkage with any element other than hydrogen, carbon or mercury, and where the substituted heterocyclic compound to which the RHg radical is attached is a condensed benzene ring and a heterocyclic ring having but one nitrogen atom which has direct linkage with only atoms in the ring.

6. An aromatic mercury substituted pyridine compound, in which the radical RHg is attached to a substituted pyridine, and where R represents an aromatic structure to a carbon atom of which the mercury is directly attached and in which none of the carbon atoms has direct linkage with any element other than hydrogen, carbon or mercury.

7. An aromatic mercury substituted quinoline compound, in which the radical RHg is attached to a substituted quinoline, and where R represents an aromatic structure to a carbon atom of which the mercury is directly attached and in which none of the carbon atoms has direct linkage with any element other than hydrogen, carbon or mercury.

8. A phenylmercury substituted heterocyclic compound, in which the phenylmercury radical is linked to a substituted heterocyclic compound having but one hetero atom which has direct linkage with only atoms in the heterocyclic ring.

9. A phenylmercury substituted heterocyclic compound, in which the phenylmercury radical is linked to a substituted heterocyclic compound having but one nitrogen atom which has direct linkage with only atoms in the heterocyclic ring.

10. A phenylmercury substituted heterocyclic compound, in which the phenylmercury radical is linked to a substituted heterocyclic compound having but one sulphur atom which has direct linkage with only atoms in the heterocyclic ring.

11. A phenylmercury substituted heterocyclic compound, in which the phenylmercury radical is linked to a heterocyclic compound having a condensed benzene ring and a heterocyclic ring containing one hetero atom which has direct linkage with only atoms in the ring.

12. A phenylmercury substituted pyridine compound in which the phenylmercury radical is linked to a substituted pyridine.

13. A phenylmercury substituted quinoline compound in which the phenylmercury radical is linked to a substituted quinoline.

14. Phenylmercury quinaldine.

15. Phenylmercury 2,6-dimethyl pyridine.

16. Phenylmercury 2,4-diphenyl thiophene.

CARL N. ANDERSEN.